J. CRESPO.
RESILIENT WHEEL.
APPLICATION FILED NOV. 4, 1918.

1,368,242.

Patented Feb. 15, 1921.

Inventor:-
Joaquin Crespo,
By- B. Singer.
Atty.

UNITED STATES PATENT OFFICE.

JOAQUIN CRESPO, OF MEXICO, MEXICO.

RESILIENT WHEEL.

1,368,242.  Specification of Letters Patent.  Patented Feb. 15, 1921.

Application filed November 4, 1918. Serial No. 261,069.

*To all whom it may concern:*

Be it known that I, JOAQUIN CRESPO, a subject of the King of Spain, and a resident of Mexico city, Mexico, have invented certain new and useful Improvements in Resilient Wheels, of which the following is a specification.

This invention relates to resilient wheels for all kinds of vehicles, and especially for automobiles, its principal object being to substitute the present day spokes of the wheel by a double combination of spiral or volute springs and of curved plate springs. The volute springs may have a conical or a cylindrical form, and may be made of sheet steel or of steel wire, their object being, in combination with the curved plate springs, to do away with the pneumatic tires, producing a wheel embodying a novel construction whereby ordinary road shocks and vibrations are absorbed by the wheel itself and by the hub member and prevented from being transmitted to the axle and body of the vehicle.

Further objects will appear from the detailed description taken in connection with the accompanying drawings, in which:

Figure 1 is a side elevation of the complete wheel embodying the present invention.

Fig. 2 demonstrates the hub member showing the grooves and pins for adjusting the different kinds of springs.

Figure 1:
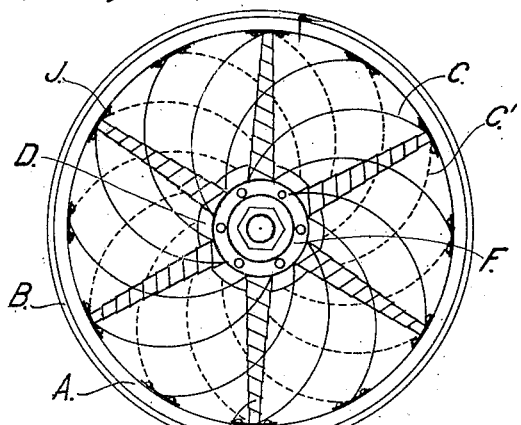
Figure 2:
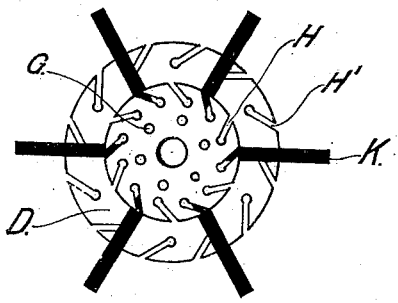
Figure 3:
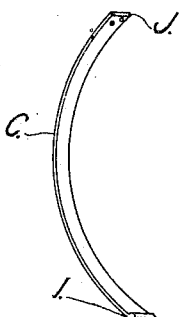
Fig. 3 is one of the curved steel springs, having a special head, which may be cylindrical, square or whatever form that may be desired.
Figure 4:
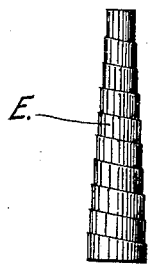
Fig. 4 is one of the conical, spiral, sheet steel springs; if desired, this can be made cylindrical.
Figure 5:
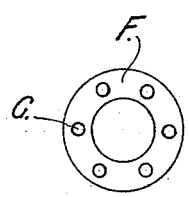
Fig. 5 is one of the plates that are bolted to each side of the hub, in order to protect the grooves of the same where the adjustment of the springs occurs and to prevent them from falling out.
Figure 6:
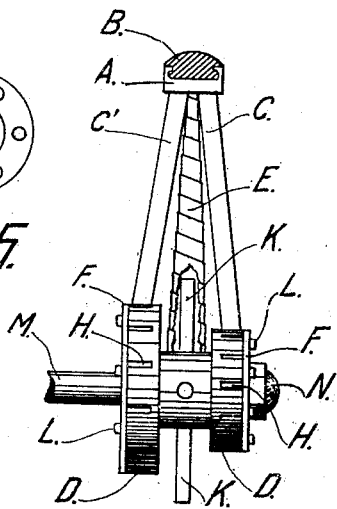
Fig. 6 is a sectional vertical view of the upper part of the wheel showing the positions of a right and a left curved spring and of a conical spring, and also the form of the hub and means for securing the springs.
Figure 7:
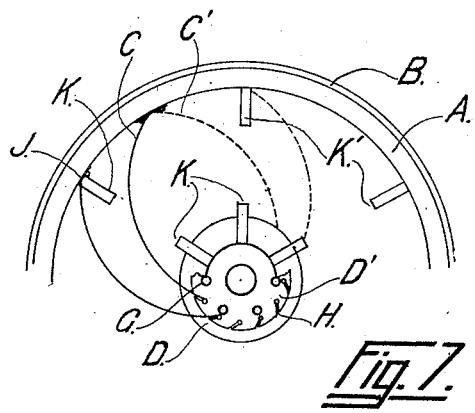
Fig. 7 is a sectional view in which are seen the pins fixed to the iron or steel tire, where the upper part of the conical or cylindrical springs is adjusted or secured. The same figure also represents the special form in which the curved spring spokes of sheet steel are placed, one to be seen on each side of the wheel.

It may be seen that this is an easy combination; Fig. 1 shows several springs E, Fig. 4, and curved steel springs C, Figs. 1, 3 and 7; the former are adjusted in their lower part or base, to the center of the hub by means of the pin K. fixed to same, Figs. 2, 6, and 7, and on the upper part to pin K′. fixed to the circle or steel tire A. Figs. 7 and 1; the latter or the curved springs C, Fig. 3, have at their lower end or that marked with letter I a special head, which is here shown as cylindrical, this head being adjusted to the hub, and the other end or that marked with letter J. shall have two or more holes; said springs are placed in two rows as indicated at C. and C′., Figs. 1, 6 and 7, adjusted or fixed at theirs ends L., Fig. 3 in two rows one on each side of the hub, being one from the other in opposite direction to its curve, that is to say, those marked with letter C., Figs. 1, 6, 7, which are placed on the outside of the hub are adjusted to grooves H. of the same Figs. 2 and 6, showing to its right its curve or end J., so that all spring spokes on the outside shall have the same direction, and the other row or that marked with letter C′., Figs. 1, 6 and 7, which are in the inside, or those marked in Figs. 6 and 7, with letter D., in this side and in the corresponding grooves H′. all the spokes of that side of the hub shall be adjusted, Figs. 2 and 6, showing to its right side its curve or end J. so that if the spring spokes which are adjusted on the outside D′. show their curve to the right, the spring spokes in the inside will show it to the left or vice versa; both rows respectively are adjusted to grooves H. and H′. of the hub as noticed in Figs. 2 and 6; said grooves are covered on both sides by plate F. Fig. 5 being adjusted to the hub by means of pins L. Fig. 6, and the upper end of the curved spring or that one marked with letter J. Fig. 3 is screwed to the iron or steel tire with two or more screws as in Figs. 1 and 7, letter J. The upper part of this iron or steel tire is covered with another solid rubber tire as in Figs. 1, 6 and 7 and marked with letter B. in order to lower the noise of the wheels.

Letter M. in Fig. 6 shows the shaft of the wheel; letter N. of said Fig. 6 shows the cork or nut which, screwed to the shaft, will adjust it to the spring wheel.

While I have herein shown and described a preferred form of my invention, I would have it understood that changes may be made in the form, proportion and construction of the several parts, without departing from the spirit of my invention and within the scope of the appended claims.

What I claim is:

1. A spring wheel comprising a hub, a rim, radially arranged helical spokes having overlapping convolutions, said spokes being attached at their outer ends to the rim and at their inner ends to the hub at points midway between the ends thereof, and tangential arcuate side springs arranged on opposite sides of the common plane of said spring spokes, attached at their outer ends to the rim and at their inner ends to the hub at points near the ends thereof.

2. A spring wheel comprising a hub, a rim, radially arranged helical spokes having overlapping convolutions, said spokes being attached at their outer ends to the rim and at their inner ends to the hub at points midway between the ends thereof, and tangential arcuate side springs arranged on opposite sides of the common plane of said spring spokes, attached at their outer ends to the rim and at their inner ends to the hub at points near the ends thereof, said side springs being also arranged in reverse relation on the opposite sides of the wheel and converging outwardly.

In testimony whereof I affix my signature in presence of two witnesses.

JOAQUIN CRESPO.

Witnesses:
W. A. ROOT,
E. M. WANETER.